United States Patent [19]

Hughes et al.

[11] 4,404,612
[45] Sep. 13, 1983

[54] DC SOLID STATE OVERLOAD RELAY

[75] Inventors: Ronald W. Hughes, Madison; Leonard J. Srnka, Independence, both of Ohio

[73] Assignee: Harvey Hubbell Incorporated, Orange, Conn.

[21] Appl. No.: 330,087

[22] Filed: Dec. 14, 1981

[51] Int. Cl.³ .............................................. H02H 7/085
[52] U.S. Cl. ...................................... 361/31; 361/95; 361/96; 361/97
[58] Field of Search ........................ 361/31, 94, 95, 96, 361/97

[56] References Cited

U.S. PATENT DOCUMENTS

| | | | |
|---|---|---|---|
| 3,444,434 | 5/1969 | Zocholl | 361/97 |
| 3,588,978 | 1/1971 | Nye, Jr. et al. | 317/13 |
| 3,604,983 | 9/1971 | Levin et al. | 361/95 |
| 3,809,985 | 5/1974 | Krause | 318/490 |
| 3,868,554 | 2/1975 | Konrad | 318/434 |
| 3,875,464 | 4/1975 | Gary et al. | 317/13 |
| 3,919,565 | 11/1975 | Clark et al. | 307/235 |
| 4,004,201 | 1/1977 | DePuy | 360/96 |
| 4,052,625 | 10/1977 | Cameron | 307/252 |
| 4,057,842 | 11/1977 | Bauman | 361/93 |
| 4,160,282 | 7/1979 | Dolinar | 361/31 |
| 4,217,616 | 8/1980 | Jessup | 361/31 |

*Primary Examiner*—Reinhard J. Eisenzopf
*Attorney, Agent, or Firm*—Jerry M. Presson

[57] ABSTRACT

A DC Solid State Overload Relay for use with a DC motor controller is provided with functions to provide instantaneous and delayed tripping of an overload relay by monitoring a standard ammeter shunt signal placed in the power line. The relay circuit uses dropping resistors and a sensing unit with the sensing unit containing separate presetable adjustment for the instantaneous and delayed tripping function and further has automatic reset provisions and a trip indicator which indicates the cause of relay tripping.

8 Claims, 5 Drawing Figures

DC SOLID STATE OVERLOAD RELAY

BACKGROUND OF THE INVENTION

1. Field of the Invention

This invention relates to electrical apparatus for detecting an overcurrent condition in a DC motor caused by the action of a DC motor controller which causes varying DC currents to flow in the power lines. These powr line currents reflect the magnitude and the duration of the motor loading.

2. Description of the Prior Art

In the operation of a DC motor, which in turn is operated by a controller and in conjunction with a load, the DC currents which flow in the power lines must be monitored in order to reflect the magnitude and the duration of the motor loading to prevent an overload condition. A standard procedure involves the use of an ammeter shunt placed in one of the controller power lines which produces a millivolt signal proportional to the magnitude of the established currents in the power lines. This proportional signal is then used to indicate the amount of motor loading. Various devices and modifications to a controller system has been employed in the prior art in order to attempt to provide an inexpensive and efficient overload monitoring device which can cut off power to the motor when the load demands become excessive.

One of the previous attempts to provide a over current protection for a monitor driven device is indicated in the U.S. Pat. No. 4,160,282 to Dolinar et al. Basically this particular embodiment discloses a series connection of a shunt to a power source for conveying direct current power to an electrically powered vehicle. The shunt generates a voltage input signal proportional to the current drawn by the load and a solid state comparator receives the input signal and compares it to a reference signal having a magnitude representing the maximum level of current permitted to flow through the conductor. One of the immediate problems with the system of this type is that the relay 34 and its contact 32 is tripped whenever the current is in excess of a reference set value no matter for how long a period of time. Thus there is no provision or method of adjusting the system for taking into account short periods of slight overload which may be caused by transient operating conditions and thus the entire system would be closed down with no provision for restart except by a manual resetting of the relay device.

One type of control system which has been developed which overcomes the above-mentioned problems with regard to providing a cut off which allows for slight amounts of overload for short periods of time is addressed in the U.S. Pat. No. 3,558,978 to Nye. This circuit presents an electronic circuit breaker which has provisions for gradual and instantaneous cut off for a motor. An input circuit is connected to receive a first signal which is related to the level of the current flow through the motor and to combine this signal with the reference to produce a resultant input signal indicating the amount of which the motor current exceeds a predetermined reference level. An amplifier circuit using amplifier 36 is connected to provide an output control signal which varies as a result of the input signal changes. A feedback circuit including capacitor 40 and resistors 41 and 42 is coupled to an amplifier circuit to provide a proportional-integral relationship between the amplifier output signal and the input signal. At this point another circuit is used to couple the amplifier circuit and to disable the firing control circuit and interrupt the energization of the motor either immediately when a sudden motor overload exceeds a previously established level or after a delay period when a motor overload is less than the established level. One of the problems associated with this type of gradual and instantaneous cut off is that the feedback control circuit establishes both the levels for the instantaneous cut off and for the gradual cut off and that a change in a capacitor or a resistor built into the circuit at 40 or 41 and 42 is necessary in order to change the delay factor or the time at which a instantaneous cut off occurs. Another problem associated with a control circuit of this type is the amount of modification necessary to a particular motor load environment in order for the circuit breaker to function. Thus, in this particular instance a normal ammeter shunt is not satisfactory and further it is not possible to easily obtain a change in the point at which the firing circuit is disabled. That is, as previously mentioned, the instantaneous cut off and the gradual cut off are interrelated and cannot be adjusted without modifying several elements including the capacitor 40 and the resistor combination 41 and 42. Another area where the Nye reference presents problems is the necessity of a manual reset for each overload detection, as indicated by the reset 82.

Accordingly it is desireable to provide an overload protection device which overcomes the problems of the prior art by being able to use a signal from a standard ammeter shunt placed to measure DC motor currents for any horsepower motor for use in a constant potential contactor type or adjustable voltage type, with overload relay isolating supply, control system having a instanteous relay tripping function and a time dependent relay tripping function each of which are independent of each other and individually adjustable but are accomplished with solid state components integrated in a single device.

SUMMARY OF THE INVENTION

Accordingly, one object of this invention is to provide a novel solid state overload relay protection circuit for detecting an excess current use by a DC motor and tripping a relay by means of an electronic sensing unit. Line current signals from an ammeter shunt are received by the electronic sensing unit which performs the two standard electro-mechanical overload relay functions in a single package including both the instaneous trip function and the overload delay function. Both of these functions are able to be performed independent of each other and are provided with independently adjustable reference setting devices.

Another object of the present invention is to provide the relay protection circuit which can be used with any ammeter shunt and any horsepower rating of a DC motor. This is accomplished by means of an input circuit for calibrating the output signal from the shunt and outputting an overload signal when the input signal exceeds a predetermined value.

Another object of the present invention is to provide a trip indicator circuit which outputs a signal when the relay has been tripped which indicates whether the tripping is due to a instantaneous overload or whether it has occurred because of the delay overload detection circuit.

A further object of the present invention is to provide a system which accomplishes both the instantaneous trip function and the delay trip function in a single integrated circuit package able to be operated with any horsepower DC motor for use with a constant potential contactor type control system or adjustable voltage control system with an appropriate overload relay isolation supply.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
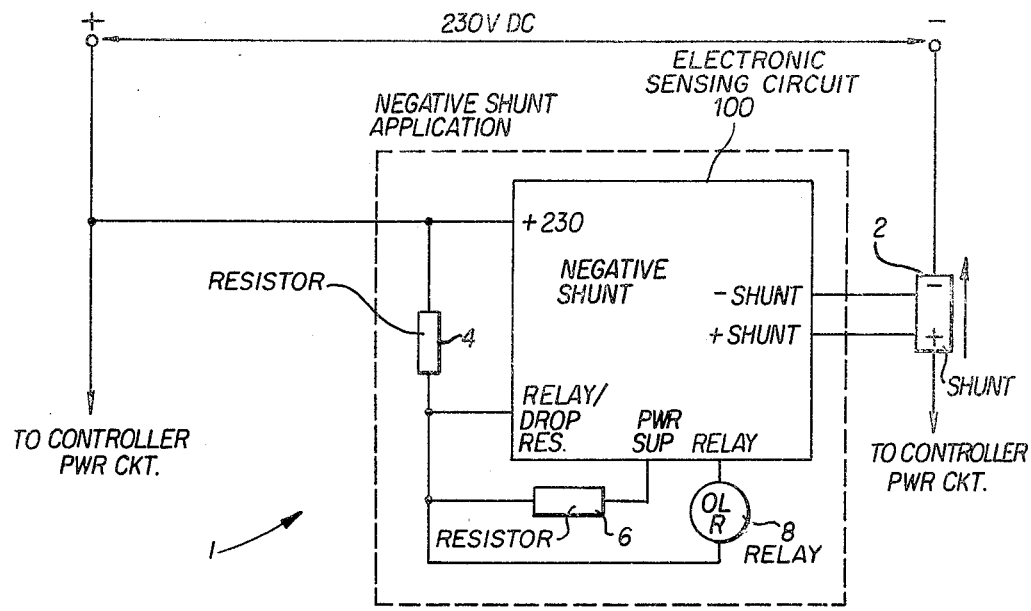
FIGS. 1 A and B and FIGS. 1C and D illustrates the overload relay circuit of the present invention for use with an ammeter shunt placed in the negative and positive power line respectively of the controller in order to monitor motor/load currents, and incorporating the overload relay isolation supply for adjusting voltage control systems.
Figure 1B:
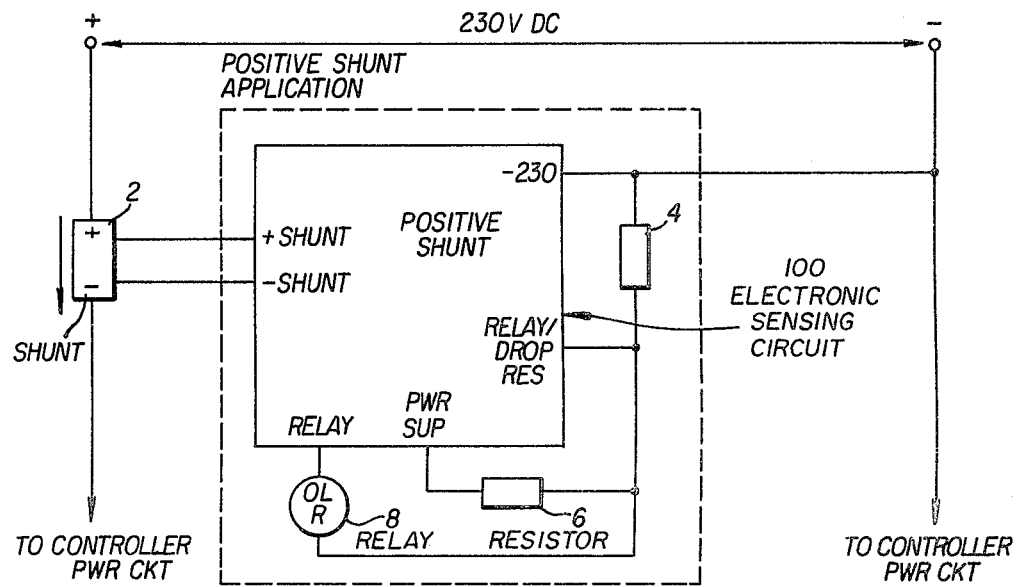
Figure 1C:
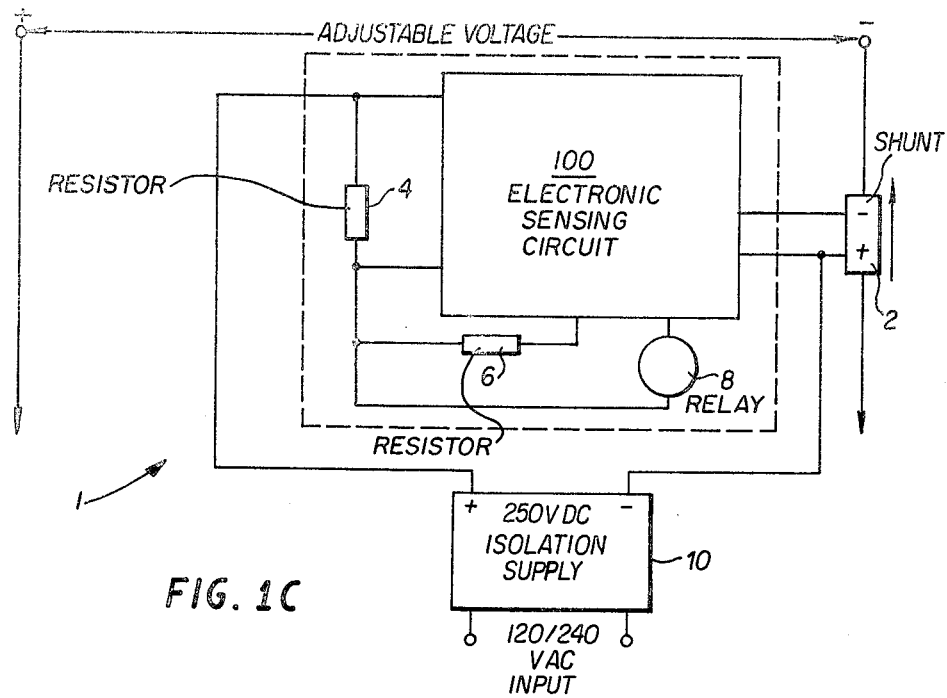
Figure 1D:
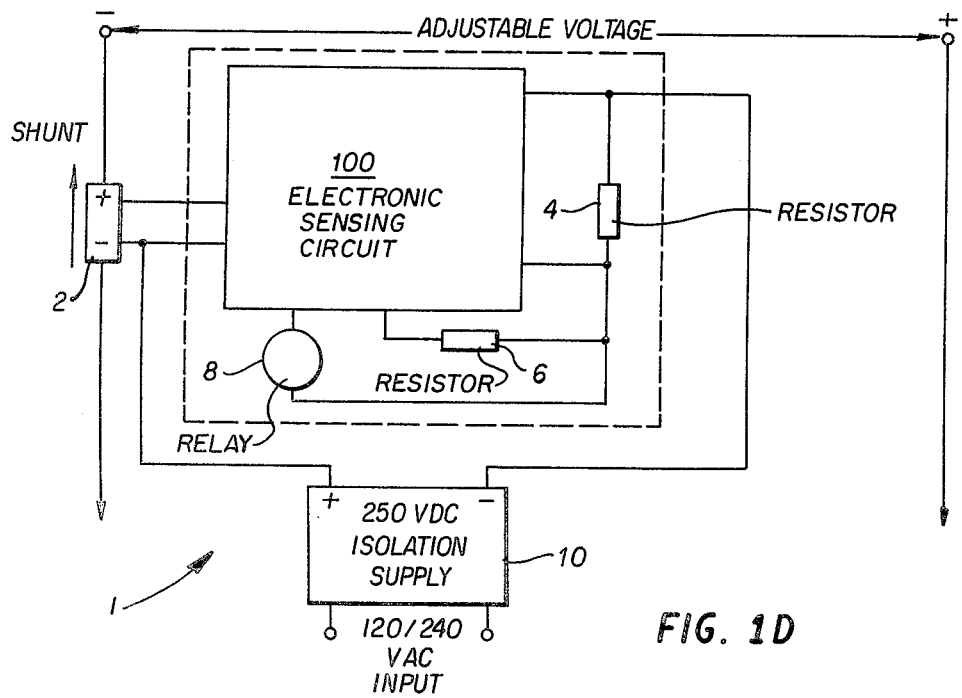

Referring now to the drawings, wherein like reference numerals designate identical or corresponding parts throughout the several views, and more particularly to FIGS. 1 A and B and 1C and D thereof, there is shown a DC solid state overload relay circuit 1 of the present invention placed in the negative power line of the controller in FIG. 1A and in the positive power line of the controller in FIG. 1B to monitor the motor/load currents. Similar applications for adjustable voltage controllers are shown in FIGS. 1C and D. A standard ammeter shunt 2 is placed in the respective power lines which provides the sensing information for the relay circuit. The relay circuit 1 consists of a pair of dropping resistors 4 and 6 the overload output relay 8 and the electronic sensing unit 100. The power is supplied in the instance of FIGS. 1A and B from the 230 volt DC motor line through the dropping resistors 4 and 6 to provide the necessary power supply for the sensing unit 100. The power is supplied in the instance of FIGS. 1C and D from an isolation supply 10 for use with adjustable voltage control systems. The dropping resistor also functions to provide the necessary power for the operation of the relay 8 and as another additional input to the sensing unit 100 to provide additional power needs for the electronic circuitry. The isolation supply 10 makes it possible to use the electronic sensing unit 100 in conjunction with any type of fixed or adjustable DC power source for a motor. The electronic sensing unit 100 receives line current signals from an ammeter shunt 2 and performs the instantaneous peak trip function and the time delay trip function for the overload on the relay as illustrated in FIG. 2.

The action of the DC motor controller, in conjunction with the motor and the load, causes varying DC currents to flow in the controller power lines as illustrated. These line currents reflect the magnitude and duration of power loading through the placement of the ammeter shunt 2 which produces a millivolt signal proportional to the magnitude of the established currents and hence proportional to the motor loading.

Figure 2:
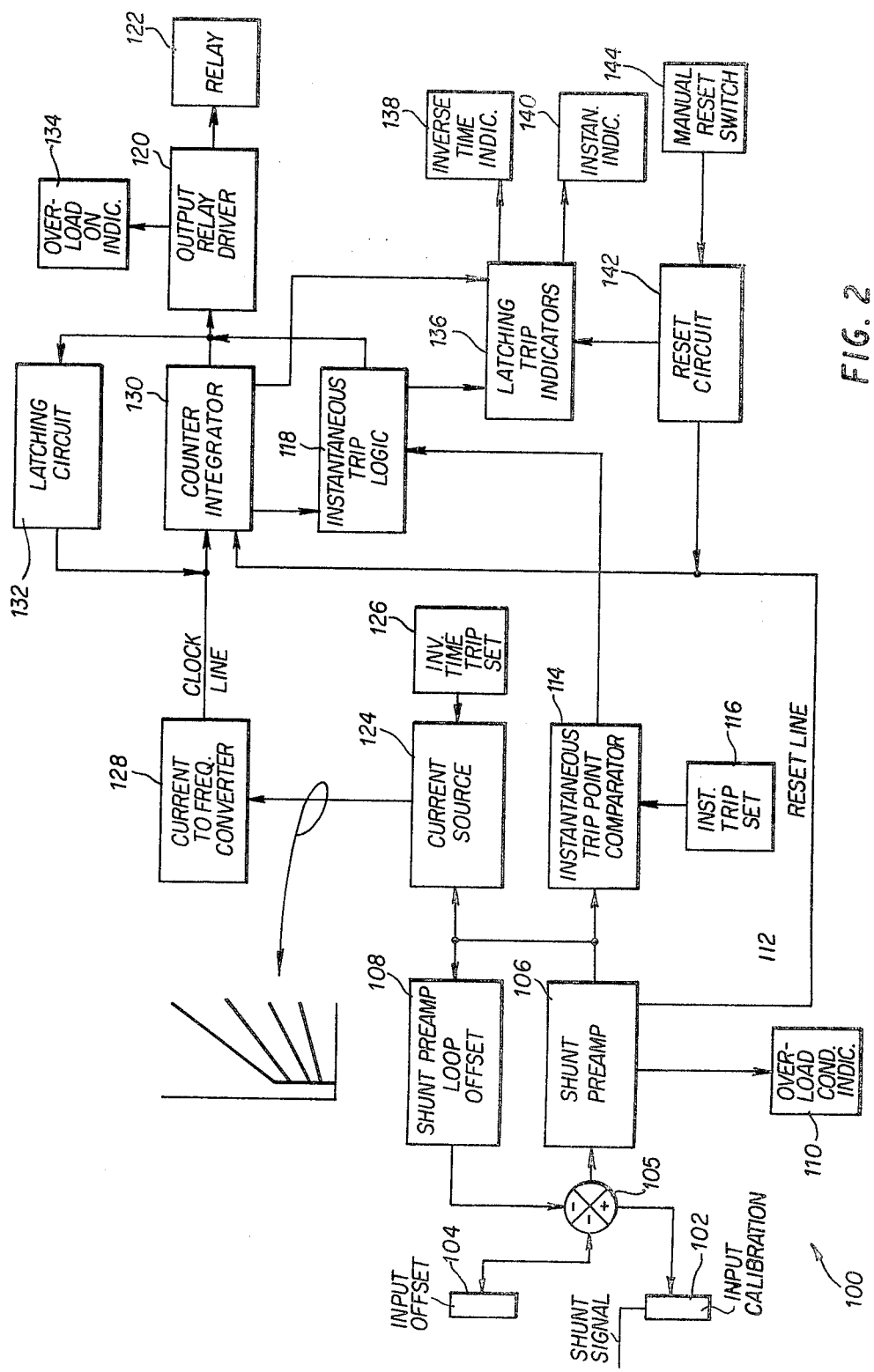
FIG. 2 is a block diagram of the DC solid state overload relay for processing the millivolt shunt signals obtained from the power line.

The electronic sensing unit 100 is illustrated in block diagram form in FIG. 2. The input signal to the sensing unit 100 is in the form of the millivolt signal from the shunt 2 and is combined with a calibration potentiometer 102 which permits a shunt signal from 25 MV to 58 MV to represent a full load motor signal level from the shunt. This feature permits an ammeter shunt to be matched to a controlled motor of any horsepower. This means that, with any horsepower motor operating with its appropriate ammeter shunt, the input calibration 102 can be set in order to easily provide matching without any modifications of the circuitry of the sensing unit or of the motor control unit. The calibrated shunt signal is then summed with an input offset signal 104 in a summing device 105 and both of these signals are amplified by the shunt preamp 106 and the loop offset circuit 108. The input offset adjustment 104 is a one time factory adjustment that sets an input signal level above which the remaining circuitry will operate. The loop offset feature of the pre-amp circuit establishes a minimum output signal from the pre-amp after the input offset value from 104 has been reached. Once the minimum output signal from the pre-amp has been reached, the overload condition indicator 110 is turned on indicating that the input signal from the shunt 2 exceeds a preset point, which in a particular instance is set at 130%. Simultaneously a system reset signal 112 is removed, thus allowing for the initiation of an accumulator overload indicator, to be discussed later.

The pre-amp output circuit consisting of the output of the shunt pre-amp 106 is connected to an instantaneous trip point comparator 114. The trip comparator compares the instantaneous value of the input shunt signal from 106 to a user selectable peak value set by the instantaneous trip set 116. If the shunt signal from the pre-amp 106 exceeds this present value of the trip setter 116, the comparator 114 switches on and signals the instantaneous trip logic circuit 118 which in turn causes the output relay driver 120 to disengage the output relay 122. The shunt pre-amp 106 output is also connected to an adjustable current source 124 which is adjustable in four ranges in the embodiment shown by use of the inverse time trip set 126. Once again this trip set is a user selectable setting device independent of the trip set for the instantaneous trip 116. The user selectable ranges established by the inverse time trip set provide a current output response from the current source 124 in direct proportion to the output of the shunt preamp current. The changing characteristics or slope of the outputted current is in direct proportion to the setting on the inverse time trip 26. That is, for a given shunt pre-amp output a current source signal is either increased or decreased in proportion to the setting of the inverse time trips set 126. The purpose of this adjustable current source is to provide a presettable means of determining how long an overload current whose value is greater than the value set by the input circuit must exist before the relay 122 is tripped. This is so because the output of the current source 124 is fed to the current to frequency converter 128 which converts the value of the current source output to a frequency signal which is clocked into the counter 130. This integrater type counter 130 counts the frequency signals from the current to frequency converter until a predetermined count is established at which point a latching circuit 132 stops the further clocking of signals to the counter 130.

The output current of the current source controls the charging rate of a capacitor in the current to frequency converter 128 and the capacitor charging rate is directly proportional to the current source output. Because the output frequency of the current to frequency converter is proportional to the capacitor changing rate and therefore is proportional to the input shunt signal after its exceeds the predetermined 130% value, the counter 130 is able to establish a digital equivalent of the time trip set 126 in order to determine when the relay 122 is to be tripped as a result of an overload current existing for a predetermined time. This predetermined time for the tripping of the relay is related not only to the amount of time that the overload condition exists but also to the amount by which the overload current exceeds the predetermined value. That is, the counter may reach a full value in two seconds if the overload is 250% but may take five seconds if the overload is merely 140%. This is reflected by the graph showing the four curves in conjunction with the current source signal being fed from the current source 124 to the current to frequency converter 128. Basically then, the inverse time trip set 126 determines the slope of the curves to be used in response to the shunt pre-amp output signal. This means that as the counting rate from the frequency converter increases in response to the shunt preamp signal, the time to reach a full count is decreased no matter what the setting of the inverse time trip set 126. This combination of circuits which provide a fixed limit digital integration is called the inverse time trip characteristic generator. As is indicated in the diagram when the counter circuit reaches it maximum count, the output relay driver 120 disengages the output relay in the same manner as the instantaneous trip signal command causes the output relay to disengage. Associated with the output driver relay 120 is a "overload on" indicator 134 which basically indicates the fact that the overload relay is receiving power and that the output relay is energized.

Associated with the instantaneous trip logic 118 and the counter 130 is a latched trip indicator 136 which receives the trip signals from the logic 118 and the counter 130 respectively to provide separate indications of the cause of the relay trip. These separate indications are provided by the inverse time trip indicator 138, which indicates that the counter 130 and consequently the overload signal through the current source 124 is the cause of the relay tripping and the instantaneous indicator 140 which indicates that the cause for the relay 122 being tripped is due to the output of the shunt pre-amp 106 being of such a value that it exceeded the instantaneous trip point comparator 114. As previously discussed in conjunction with the reset signal 112 from the shunt pre-amp 106, the counter 130 is set at 0 automatically until the reset signal 112 is removed which allows the counter 130 to accumulate the pulses arriving from the frequency converter 128. Also provided is a manual reset circuit 142 with a manual reset switch 144 and an auto-manual select switch which keep the output relay disengaged until the circuit is manually reset. Thus it can be seen that, with the automatic trip function in operation, the reset occurs only when the input shunt signal falls below the value necessary to output a signal from the shunt pre-amp 106. Other possible provisions include a manual reset associated only with the latching trip indicators in order to provide a fault finding function.

Obviously, numerous additional modifications and variations of the present invention are possible in light of the above teachings. It is therefore to be understood that within the scope of the appended claims, the invention may be practiced otherwise than specifically described herein.

What is claimed as new and desired to be secured by Letters Patent of the United States is:

1. An overload relay circuit for a DC motor having a constant potential contactor type control system or an adjustable voltage control system and a standard ammeter shunt comprising:
   input circuit means for calibrating the output signal of said shunt and outputting an overload signal when said input signal exceeds a first predetermined value;
   instantaneous adjustable trip comparator means for tripping said relay when said overload signal exceeds a second predetermined value;
   delayed relay trip circuit means responsive to said overload signal for tripping said relay when said overload signal exceeds a third predetermined value for a predetermined period of time;
   automatic-manual reset circuit responsive to said relay tripping signals to reset said delayed and instantaneous relay trip circuit; and
   latching trip indicator circuit responsive to the output of said instantaneous trip comparator to indicate that said trip comparator circuit has output a relay trip signal and responsive to said delayed relay trip circuit means to indicate that said relay trip circuit means has output a signal whereby the cause of said trip relay is indicated.

2. The overload relay circuit of claim 1, wherein said input circuit comprises an input calibration for converting the output of said standard ammeter shunt to a predetermined base value.

3. The overload relay circuit of claim 1, wherein said delayed relay trip circuit means comprises an adjustable current source which provide a selectable series of response output currents each of which is proportional to said overload signal.

4. The overload relay circuit of claim 3, further comprising a current to frequency converter responsive to the outut of said current source to provide a frequency signal proportional to said overload signal.

5. The overload relay circuit of claim 4, further comprising a counter means for counting the output of said frequency converter and outputting a signal to trip said relay when said counter reaches a predetermined fixed digital value.

6. A DC solid state overload relay protection circuit for detecting excess current use of a DC motor and triggering a relay, comprising:
   ammeter shunt for providing a signal indicator of motor current;
   first comparator means responsive to said shunt signal for indicating an overload condition and outputting a signal proportional to the value of said shunt signal above a preset reference value of said comparator;
   second adjustable comparator means set at a second value responsive to said first comparator output for instantaneously tripping said relay when said shunt signal exceeds said second set value;
   gain range adjustable current source responsive to said first comparator output signal and to a preset plurality of reference gain ranges to output a signal proportional to said shunt signal and the preselected gain range of said current source; and relay tripping circuit responsive to the output of said current source to trip said relay when a predetermined value has been obtained.

7. The DC solid state overload relay protection circuit of claim 6, further comprising an automatic reset circuit responsive to said relay tripping to reset said relay tripping circuit.

8. The DC solid state overload relay protection of claim 6, further including an latching trip indicator circuit responsive to the output of said second adjustable comparator means to indicate that said second adjustable comparator means has output a signal to trip said relay and responsive to said relay tripping circuit output to indicate that said relay tripping circuit has output a signal whereby the cause of said trip relay is indicated.

* * * * *